United States Patent [19]

Wujnovich et al.

[11] 4,263,140
[45] Apr. 21, 1981

[54] IN-LINE FLUID FILTER

[75] Inventors: Ronald J. Wujnovich, South Euclid; Earl D. Shufflebarger, Mentor; William C. Steiss, Parma, all of Ohio

[73] Assignee: Nupro Company, Willoughby, Ohio

[21] Appl. No.: 27,301

[22] Filed: Apr. 5, 1979

[51] Int. Cl.³ ............................................. B01D 35/02
[52] U.S. Cl. .................................... 210/247; 210/445; 210/446; 210/456; 210/499; 210/493.5
[58] Field of Search .................... 29/163.5 F, 414, 463; 210/247, 456, 435, 445, 446, 451, 453, 454, 483, 493, 494, 495, 499

[56]  References Cited
U.S. PATENT DOCUMENTS

| 15,263 | 7/1856 | Wright | 210/456 X |
|---|---|---|---|
| 96,747 | 11/1869 | Watts | 210/445 X |
| 622,217 | 4/1899 | Fuller et al. | 210/499 X |
| 794,840 | 7/1905 | Barker | 210/456 X |
| 1,738,689 | 12/1929 | Brown et al. | 29/463 X |
| 1,768,367 | 6/1930 | McKinley et al. | 210/85 |
| 1,788,412 | 1/1931 | Sperry | 210/445 X |
| 2,202,403 | 5/1940 | Sandberg | 210/445 X |
| 3,004,671 | 10/1961 | Sugalski et al. | 210/445 |
| 3,156,976 | 11/1964 | Whiting | 29/471.5 |
| 3,327,866 | 6/1967 | Pall et al. | 210/499 |
| 3,388,448 | 6/1968 | Lovett | 210/499 X |
| 3,388,805 | 6/1968 | Lovett | 210/499 X |
| 3,406,828 | 10/1968 | Boston | 210/137 |
| 3,622,007 | 11/1971 | Pappathatos | 210/445 |
| 3,658,183 | 4/1972 | Best et al. | 210/446 |
| 3,844,025 | 10/1974 | Lingnau | 29/482 |
| 3,872,576 | 3/1975 | Mott | 210/446 X |
| 3,932,153 | 1/1976 | Byrns | 210/446 X |
| 4,028,248 | 6/1977 | Murauskas | 210/445 X |

FOREIGN PATENT DOCUMENTS 98389 of 1895 Fed. Rep. of Germany .......... 210/445

OTHER PUBLICATIONS

Miniaturized microporous Inline Filter, 4200 Series, Advertising of Circle Seal Products, 2 pp.

Primary Examiner—Frank A. Spear, Jr.
Attorney, Agent, or Firm—Fay & Sharpe

[57]  ABSTRACT

An in-line fluid filter of the multi-piece type having a pair of body sections coaxially secured to each other. A filter element is fixedly disposed transversely across a filter chamber defined by the body sections intermediate a fluid filter inlet and outlet. This filter element includes an annular mounting flange interposed between mating annular body section end faces. A generally cup-shaped filter element support is fixedly located on at least the outlet side of the filter element and is dimensioned so that the filter element is at least partially received in the cup-shaped area thereof. This support includes an annular mounting rim which is also interposed between the body section end faces. The support allows the filter to experience greatly increased fluid pressure differentials across the filter element. The filter element mounting flange and the support mounting rim are dimensioned to at least extend to the outside diameter of the mating body section annular end faces. The body sections are rigidly affixed to each other at the end faces by means of a fusion type weld with at least a portion of the filter element mounting flange and the support mounting rim comprising a filler material for the weld to assist in producing a joint of high integrity. A pair of the filter element supports may be advantageously employed wherein the supports are in an opposed relationship to each other having the filter element positioned therebetween.

2 Claims, 7 Drawing Figures

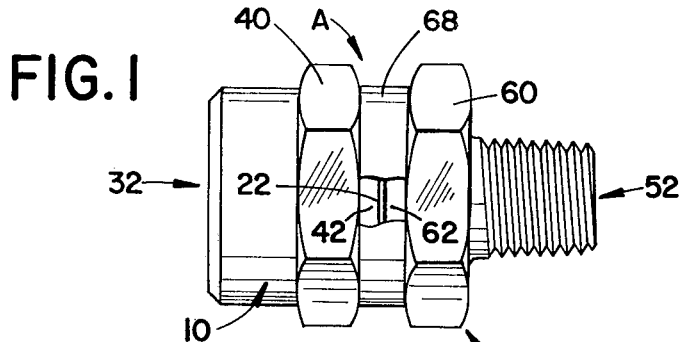
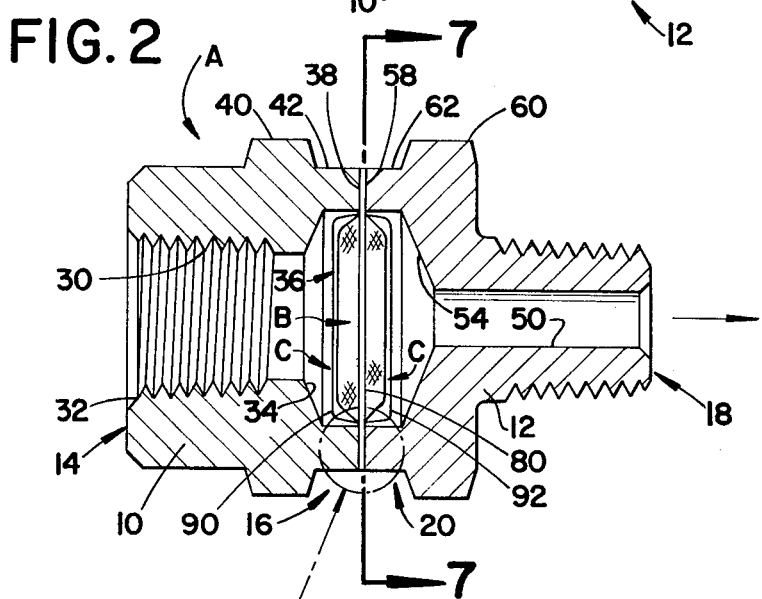
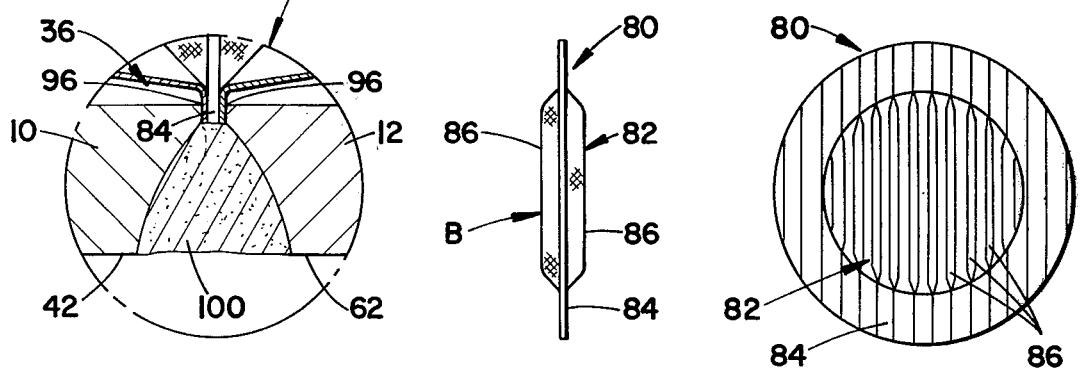
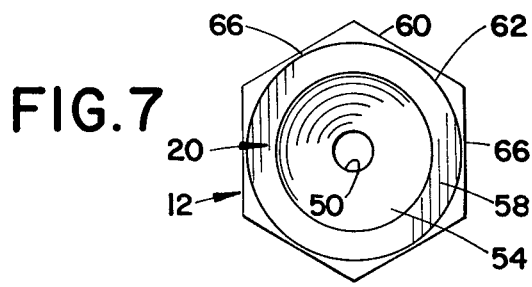

IN-LINE FLUID FILTER

BACKGROUND OF THE INVENTION

This application pertains to the art of filters and more particularly to fluid type filters.

The invention is particularly applicable to an in-line type welded filter design and will be described with particular reference thereto. However, it will be appreciated by those skilled in the art that the overall invention has broader applications and could be adapted to use for other applications in different environments.

Heretofore, there have been quite a number of different types and styles of fluid filters, including in-line type fluid filters. Among these have been the so-called multi-piece welded filter constructions wherein a pair of filter body sections are disposed in an end to end relationship with a filter element interposed and partially captured therebetween. The two filter body sections are welded together peripherally around end face or shoulders. Such welding also fixedly retains the filter element in position generally transverse across a filter chamber defined internally of the body sections. The body sections each include means for conveniently installing the filter in a fluid system so that fluid entering the fluid inlet will be filtered prior to exiting from the filter outlet.

Prior welded type in-line filters have utilized various filter element constructions, including those of a pleated or accordian configuration. In such filter element configurations, the filter element material is formed to have a plurality of closely spaced alternating folds with the filter material between adjacent folds extending generally longitudinally of the filter itself. This increases the surface area of the filter element material exposed to fluid passing through the filter, and thus enhances filter efficiency.

While the above noted multi-piece welded fluid filters have found use and acceptance in a wide variety of fluid or liquid filtering environments and systems, certain problems are encountered when these filters are installed in high pressure fluid systems and/or subjected to differential fluid pressures. These prior filter constructions have typically been able to withstand a maximum differential pressure across the filter element on the order of magnitude of approximately 50 psi. Differential pressures are typically encountered when the filter element begins to clog, when there are high surge pressures in the system, when a high fluid flow or a viscous liquid flow is involved and when there is a pulsating type of fluid flow in the system. In the event the pressure differential across the filter element exceeds the allowable maximum, the filter element itself can be permanently damaged so that it is ineffective for its fluid filtering function.

In addition, when filters of the multi-piece welded type are subjected to high fluid pressures, i.e., on the order of magnitude of 6000 psi or so, it is particularly necessary and desirable to have the fitting body sections interconnected in a manner that will insure a connection of high integrity. Without such a connection, it is possible that the filter may fail at less than the rated pressure capabilities.

The present invention contemplates a new and improved device which overcomes these problems and others and provides a new and improved in-line fluid filter of the multi-piece welded type which is simple, reliable at elevated operating pressures, increases the allowable differential pressure across the filter element and which is readily adapted to use in a number of fluid or liquid environments.

BRIEF DESCRIPTION OF THE INVENTION

In accordance with the present invention, there is provided an in-line fluid filter which includes a filter body comprised of first and second body sections disposed longitudinally of each other and defining an internal, generally cylindrical filter chamber therebetween. The first body section includes a fluid inlet extending inwardly from one end thereof and opening into an enlarged area defining one portion of the fluid chamber adjacent the first body section other end. This first section other end also includes a first end or connecting face disposed in a plane normal to the filter body longitudinal axis. The second section other end has a second end or connecting face dimensionally compatible with the first end face and disposed in a plane normal to the filter body longitudinal axis. A fluid filter element having a filter portion extends at least substantially transversely across the filter chamber. This filter element includes a mounting flange generally coplanar with the filter portion, extending peripherally therearound and interposed between the first and second end faces. At least one filter element support extends across the filter chamber on the downstream side of the filter portion with at least a portion of the support also interposed between the first and second end faces. The first and second body sections are rigidly affixed to each other at the first and second end faces by weld means with the filter element and support fixedly positioned in the filter chamber.

In accordance with another aspect of the present invention, the filter support has a generally cup-shaped configuration with a greater porosity than the filter element filter portion. The filter portion is at least partially received in the cup-shaped configuration. The filter support further includes a peripheral flange or rim dimensioned to be received between the first and second end or connecting faces.

According to a further aspect of the present invention, the filter element mounting flange and the filter element support flange or rim extend outwardly to at least the outside dimension of the first and second end or connecting faces. During filter assembly, the filter element mounting flange and filter element support flange or rim are integrally welded with the first and second or connecting faces to enhance the integrity of the joint therebetween. In the preferred arrangement, the first and second body sections are fusion welded together with the mounting flange and support flange or rim acting as a filler material at the weld area.

According to a still further aspect of the present invention, a pair of substantially identical cup-shaped filter supports are utilized and are disposed in an opposed relationship to each other on opposite sides of the filter element filter portion. The supports are positioned in a manner such that the filter portion is at least partially received in the cup-shaped area of each support.

In accordance with a preferred form of the present invention, at least the filter element filter portion is configured to have a plurality of closely spaced alternating fold areas thereacross. The filter material between consecutive fold areas extends generally longitudinally of the filter body.

In accordance with another aspect of the present invention, the body sections each include a wrench flat area. Each of these areas is dimensioned to extend further radially outward than an axial portion of the associated body section side wall adjacent the end or connecting face thereof. This feature allows an identifying band to be received around the body section portions and over the area of the joint therebetween in a manner such that when a wrench flat is applied to either of the wrench flat areas, it will not interfere with or deface the identifying band.

The principal object of the present invention is the provision of a new and improved in-line type fluid filter of the multi-piece welded type.

Another object of the present invention is the provision of a new and improved fluid filter of the above type which is capable of withstanding an increased pressure differential across the filter element.

Still another object of the present invention is the provision of a new and improved fluid filter of the above type in which the welded joint between abutting end faces of longitudinally aligned body sections has increased integrity.

Still other objects and advantages to the present invention will become apparent to those skilled in the art upon a reading and understanding of the following specification.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof and wherein:

FIG. 1 is a side elevational view of an in-line fluid filter of the multi-piece welded type which incorporates the concepts of the subject invention and with a portion of an identifying band cut away for showing the welded joint between abutting body sections.

FIG. 2 is a longitudinal cross-sectional view of the fluid filter of FIG. 1 with the fitting components shown in an assembled condition prior to welding;

FIG. 3 is a cross-sectional view of a filter element support;

FIG. 4 is a side view of the preferred filter element construction;

FIG. 5 is a front view of the filter element construction of FIG. 4;

FIG. 6 is an enlargement of the circled area of FIG. 2 after welding for showing in detail where a portion of the filter element and filter element supports act as weld joint filler material; and, FIG. 7 is a cross-sectional view taken along lines 7—7 of FIG. 2.

DESCRIPTION OF THE PREFERRED EMBODIMENT

Referring now to the drawings wherein the showings are for purposes of illustrating the preferred embodiment of the invention only and not for purposes of limiting same, the FIGURES show a fluid filter including a filter body A (FIG. 1) having a filter element B (FIG. 2) disposed therein and supported at both the upstream and downstream sides thereof by filter supports C (FIG. 2).

More particularly, the filter body is comprised of a first body section 10 and a second body section 12. While a number of materials could be advantageously employed, these body sections are preferably machined from 316 type stainless steel. First body section 10 includes an outer end 14 and an inner end 16 with second body section 12 including an outermost end 18 and an innermost end 20. Body sections 10,12 have generally cylindrical configurations and are fixedly interconnected at ends 16,20 by means of a joint 22 (FIG. 1) extending circumferentially therearound. This joint comprises a welded joint, the specifics of which will be described in greater detail hereinafter.

The first body section includes a coaxial passageway 30 extending from an inlet 32 at outer end 14 and merging into an enlarged area 34 adjacent inner end 16. Enlarged area 34 defines approximately one half of a generally cylindrical filter chamber 36. In addition, passageway 30 includes convenient means adjacent inlet 32 for installing the filter in a fluid system. While female pipe threads are employed in the structural arrangement shown, any other type of interconnection could also be advantageously employed without departing from the overall intent or scope of the present invention.

Inner end 16 of first body section 10 terminates in an annular connecting face or shoulder 38 which is disposed substantially normal to the longitudinal axis of the body section. A wrench flat area 40 extends radially outward of the first body section a distance at least slightly greater than cylindrical side wall portion 42 adjacent inner end 16. The reasons for this preferred dimensional relationship will become more readily apparent hereinafter.

Second body section 12 includes a passageway 50 extending coaxially therethrough from an outlet 52 adjacent outermost end 18 and merges into an enlarged area 54 adjacent innermost end 20. This enlarged area defines the other half of filter chamber 36. Convenient means are also included on the second body section adjacent outermost end 18 for installing the filter in a fluid system. In the preferred arrangement shown, male pipe threads are employed although, again, any other convenient installation means could also be advantageously utilized.

Second body section innermost end 20 terminates in an annular connecting face or shoulder 58 disposed generally normal to the longitudinal axis of the filter and which is dimensionally compatible with annular connecting face or shoulder 38 of first body section 10. A wrench flat area 60 extends radially outward of the second body section a distance at least slightly greater than cylindrical side wall portion 62 adjacent innermost end 20. In the preferred arrangement, both of wrench flat areas 40,60 are hexagonal in configuration although other configurations could also be advantageously employed.

As shown in the FIGURES, the dimensional relationship between wrench flat area 40 and side wall 42 is the same as that for wrench flat area 60 and side wall 62. Therefore, the following description is deemed equally applicable to both unless otherwise specifically noted. Referring to FIG. 7, it will be seen that wrench flat area 60 is comprised of six distinct sides which are all spaced radially outward from cylindrical side wall portion 62 of the second body section. At the closest spacing between this side wall portion and each of the wrench flat area sides, there is a small radial increment as is generally designated 66.

This particular relationship allows a thin band generally designated 68 (FIG. 1) to be placed circumferentially around filter body A at side wall portions 42,62 and over joint 22. The thickness of this band is slightly less than increments 66 and includes appropriate identifying indicia relating to filter operation, size and the like. Band 68 may be conveniently constructed of paper, plastic, foil or the like having the desired indicia imprinted on the front face thereof. In addition, the rear face may include an adhesive for fixedly securing the band to filter A in the position shown. The relationship between increments 66 and the thickness of band 68 are important in that operational and identifying indicia on the band will not be defaced or otherwise destroyed when a wrench is applied to either of wrench flat areas 40,60 during filter installation and removal.

FIGS. 4 and 5 comprise a more detailed showing of the preferred filter element B utilized in the subject invention. More particularly, the filter element includes a filter element body generally designated 80 which, in turn, is comprised of a filter portion 82 and an annular mounting flange 84 disposed about the outer periphery thereof. The filter portion and mounting flange are generally coplanar with each other. Overall, the filter element body is constructed from an appropriate filter material to have a generally pleated or accordian configuration for increasing the surface area of the filter material available during a filtering process. As will be noted in viewing both FIGS. 4 and 5, filter portion 82 includes a plurality of spaced apart fold areas 86 extending oppositely outward of mounting flange 84. Thus, the filter material between adjacent folds extends generally longitudinally of the filter (FIG. 2). The mounting flange may be similarly constructed and simply crushed or pressed into a flattened condition in the manner shown in both FIGS. 4 and 5. The specific construction of filter element does not, taken by itself, form a part of the present invention.

In the preferred arrangement here under discussion, a wide variety of filter elements can be utilized for achieving different filter capabilities. For example, separate filter elements for filtering particle sizes of 2, 7 and 15 microns could be advantageously employed. Also in the preferred arrangement, such filter elements are constructed from 316 type stainless steel mesh except for the 2 micron size which is constructed from 304 type stainless steel mesh for cost reasons. Of course, other combinations of particle size filtering capabilities and filter element constructions could also be employed without in any way departing from the overall intent or scope of the present invention.

With reference to FIG. 2, it will be noted that annular mounting flange 84 is substantially dimensionally compatible with annular connecting faces 38,58. Indeed, it is extremely beneficial that the outer diameter of mounting flange 84 be at least as large, if not slightly larger, than the outside diameter of faces 38,58. The reasons for this desired dimensional relationship will be described in greater detail hereinafter.

Filter supports C as shown in FIG. 2 comprise a pair of identical filter support bodies 90,92. A cross-sectional view of body 92 is shown in greater detail in FIG. 3, it being understood that filter support body 90 is identical thereto unless otherwise specifically noted. More particularly, filter support body 92 includes a support portion 94 having a generally cup-shaped configuration. The cup-shaped portion is conveniently dimensioned to at least partially receive filter portion 82 of filter element body 80. An annular mounting flange or rim 96 extends radially of support portion 94 at the open end thereof. This flange or rim is substantially dimensionally compatible with annular connecting faces 38,58 of first and second body sections 10,12. Here too, the outside diameter of flange or rim 96 is at least equal to or slightly greater than the outside diameter of connecting faces 38,58.

Preferably, filter support bodies 90,92 are constructed from a 316 type stainless steel mesh. A 100 mesh is advantageously employed and this mesh size may remain constant for all the above noted filter elements having different particle size ratings. However, this 100 mesh size could be altered without departing from the overall intent or scope of the present invention.

Referring now to FIG. 2 wherein the filter components are shown in their relative assembled positions prior to the welding together of first and second body sections 10,12, it will be seen that the filter portion of filter element B extends at least substantially across filter chamber 36. As will also be seen, the filter element mounting flange is captured between opposed annular connecting faces 38,58 of body sections 10,12. Filter support bodies 90,92 are disposed in an opposed relationship to each other with the cup-shaped support portions thereof also extending substantially transversely across filter element chamber 36 and with the mounting flange or rims thereof interposed between annular connecting faces 38,58. As noted hereinabove, the mounting flanges are dimensioned to have an outside diameter at least as great as the outside diameters of faces 38,58. Further, the filter portion of filter element B is at least partially received within the cup-shaped support portion of each support body. While the filter portion of the filter element does not engage the bottom walls of the cup-shaped portions of filter support bodies 90,92 in the preferred construction shown, there may be at least some contact therebetween in some instances. Such a spaced or contacting relationship is primarily a function of tolerance control and does not in any way affect the overall fluid filtering process. Moreover, and while the preferred embodiment utilizes a pair of filter support bodies 90,92, it is entirely possible in some instances to eliminate use of support body 90 and simply rely upon the presence of support body 92 for providing the necessary and desired support. It is important, however, that at least one support body be employed and that it be located on the downstream side of the filter element.

FIG. 6 shows a cross-sectional view of a portion of the fluid filter following welding of body sections 10,12 at the interface between the annular connecting faces or shoulders 38,58. In the preferred arrangement, a fusion type of weld is advantageously employed and accomplished by conventional, known means. In FIG. 6, the fusion weld area extending inwardly from side wall portions 42,62 has a generally V-shape and is generally designated 100. Since this weld area extends radially inward from the outside diameter of the body sections, filter element mounting flange 84 and mounting flanges or rims 96 of the filter supports are integrally welded to each other and to the body sections themselves at the area of interface between the connecting faces or shoulders 38,58. Indeed, mounting flange 84 and mounting flanges or rims 96 act as a filler for weld area 100 in order to assist in producing a connection or joint of very high integrity between the two body sections. Following fusion welding, band 68 (FIG. 1) is affixed to filter body A to circumferentially span the weld area, i.e., joint 22 and at least axial sections of both side wall portions 42,62.

The construction of the subject fluid filter as described in detail hereinabove encapsulates filter element B between a pair of opposed filter supports C. This feature is deemed to be particularly advantageous in preserving the filter element when differential fluid pressures are encountered thereby. Further, the upstream one of filter supports C, i.e., filter support body 90 acts as an initial filter element for large particles which may be passing through the fluid system. This feature acts to enhance the filter life since particles trapped by support body 90 do not significantly increase the differential pressures. Differential pressures are typically encountered when the filter element itself begins to clog, when high surge pressures are present in the fluid system, when a high fluid flow or a viscous liquid flow is involved and when there is pulsating fluid flow in the system.

Previous filters of this general type have only been effective at differential pressures of no greater than 50 psi. However, and in utilizing the concepts of the subject invention, the filter supports allow a substantial increase in the permissible differential pressures. The subject new and improved construction will allow differential pressures on the order of magnitude of from 100 to 150 psi to be encountered without damage to filter element B. Moreover, tests on the new filter construction have been run with differential pressure of up to 400 psi. Even then, only minimal damage to the filter element and minor changes in the fluid flow were encountered. This is believed to be a substantial improvement over prior filters of this general type.

In addition, the subject filter construction may be satisfactorily and advantageously utilized in fluid systems rated up to 6000 psi. This result is partially obtained from the above described dimensional characteristics between annular connecting faces or shoulders 38,58, filter element mounting flange 84 and support body mounting rims 96 which allow the mounting flange and rims to become fused with the weld joint between the two body sections. This enhances joint integrity (22 in FIG. 1 and 100 in FIG. 6) while still retaining the filter element and filter supports fixedly secured in position generally transversely across filter chamber 36.

The invention has been described with reference to the preferred embodiment. Obviously, modifications and alterations will occur to others upon the reading and understanding of this specification. It is my intention to include all such modifications and alterations insofar as they come within the scope of the appended claims or the equivalents thereof.

Having thus described my invention, I now claim:

1. A filter assembly comprising: a filter body having an axial passage therethrough between opposite body ends, a filter cavity in said body intermediate said ends and being intersected by said passage, a filter element positioned in said cavity across said passage, said filter element having a peripheral flange and being pleated to have fold areas extending outwardly on both sides of the plane of said flange, cup-shaped filter element supports positioned on opposite sides of said filter element and having said fold areas received therein, said filter element and said filter element supports being of metal wire mesh and said supports having a greater porosity than said filter element, said filter element supports having peripheral flanges positioned against opposite sides of said filter element peripheral flange, said filter body including a pair of body sections having end faces between which all of said peripheral flanges are received, and said body sections being fusion welded together at said end faces with said peripheral flanges being fusion welded together and to said end faces.

2. The filter assembly as defined in claim 1 wherein said filter body, said filter element and said filter element supports are all of the same type of metal.

* * * * *